United States Patent
Cassel et al.

(10) Patent No.: US 12,337,241 B2
(45) Date of Patent: *Jun. 24, 2025

(54) AUTOMATIC PRESENTATION OF SUITABLE CONTENT

(71) Applicant: Roblox Corporation, San Mateo, CA (US)

(72) Inventors: Daniel Jakob Cassel, San Mateo, CA (US); Matthew Dean, San Francisco, CA (US); Alevtina Stolpnik, San Francisco, CA (US); Alex Michael Quartulli, Branford, CT (US); Craig Harris Collins, Jr., San Mateo, CA (US); Gavin Fynbo, San Francisco, CA (US); Chen Zou, Vancouver (CA)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,501

(22) Filed: Jan. 22, 2024

(65) Prior Publication Data
US 2024/0157250 A1 May 16, 2024

Related U.S. Application Data

(63) Continuation of application No. 17/747,433, filed on May 18, 2022, now Pat. No. 11,911,701.
(Continued)

(51) Int. Cl.
*A63F 13/77* (2014.01)
*A63F 13/537* (2014.01)
(Continued)

(52) U.S. Cl.
CPC ............ *A63F 13/77* (2014.09); *A63F 13/537* (2014.09); *A63F 13/60* (2014.09); *A63F 13/73* (2014.09);
(Continued)

(58) Field of Classification Search
None
See application file for complete search history.

(56) References Cited

U.S. PATENT DOCUMENTS

| 11,461,434 B2 | 9/2022 | Sitrick et al. |
| 2002/0169592 A1 | 11/2002 | Aityan |

(Continued)

FOREIGN PATENT DOCUMENTS

| JP | 2000-050233 | 2/2000 |
| JP | 2017-502387 | 1/2017 |

OTHER PUBLICATIONS

USPTO, Non-final Office Action for U.S. Appl. No. 17/747,433, filed Apr. 25, 2023, 11 pages.
(Continued)

*Primary Examiner* — Jason T Yen
(74) *Attorney, Agent, or Firm* — IP Spring

(57) ABSTRACT

Implementations described herein relate to methods, systems, and computer-readable media to automatically present suitable content for a particular audience. In some implementations, a computer-implemented method receiving virtual experience content associated with a first virtual experience associated with a first target audience and including content that is restricted as not viewable by a second target audience, receiving at least one content alternative, generating a first rating for the received virtual experience content and a second rating for the at least one content alternative, and automatically providing only one of the received virtual experience content or the at least one content alternative to user devices based on the first rating and the second rating.

20 Claims, 8 Drawing Sheets

Related U.S. Application Data

(60) Provisional application No. 63/189,964, filed on May 18, 2021.

(51) Int. Cl.
  *A63F 13/60* (2014.01)
  *A63F 13/73* (2014.01)
  *A63F 13/79* (2014.01)
  *G06F 16/48* (2019.01)

(52) U.S. Cl.
  CPC .............. *A63F 13/79* (2014.09); *G06F 16/48* (2019.01); *A63F 2300/5546* (2013.01); *A63F 2300/6009* (2013.01)

(56) References Cited

U.S. PATENT DOCUMENTS

| | | |
|---|---|---|
| 2004/0194128 A1 | 9/2004 | McIntyre et al. |
| 2006/0161952 A1 | 7/2006 | Herz et al. |
| 2006/0206871 A1 | 9/2006 | Kohlmeier et al. |
| 2007/0099706 A1 | 5/2007 | Nuta et al. |
| 2008/0195664 A1* | 8/2008 | Maharajh .............. G06F 16/487 |
| 2009/0115776 A1* | 5/2009 | Bimbra .................. G06T 19/00 345/530 |
| 2009/0198789 A1 | 8/2009 | Young et al. |
| 2010/0241417 A1 | 9/2010 | Bassett et al. |
| 2011/0083086 A1* | 4/2011 | Brownlow .............. A63F 13/79 715/753 |
| 2012/0096514 A1* | 4/2012 | Tuscano ................ G06F 16/958 726/1 |
| 2012/0221321 A1 | 8/2012 | Nakamura et al. |
| 2014/0068661 A1 | 3/2014 | Gates, III et al. |
| 2014/0337989 A1 | 11/2014 | Orsini et al. |
| 2015/0120273 A1 | 4/2015 | Gusakov et al. |
| 2015/0242917 A1 | 8/2015 | Curtis et al. |
| 2015/0302891 A1 | 10/2015 | Barton et al. |
| 2016/0107088 A1 | 4/2016 | Jackson et al. |
| 2016/0287984 A1 | 10/2016 | Principato et al. |
| 2016/0300388 A1* | 10/2016 | Stafford .................. A63F 13/69 |
| 2017/0083512 A1 | 3/2017 | Bangarambandi et al. |
| 2017/0169015 A1 | 6/2017 | Huang |
| 2019/0104329 A1 | 4/2019 | Bharti et al. |
| 2019/0356753 A1 | 11/2019 | Yong et al. |
| 2019/0361797 A1 | 11/2019 | Yerli |
| 2020/0077150 A1 | 3/2020 | Fox et al. |
| 2020/0155943 A1* | 5/2020 | Eatedali .................. A63F 13/67 |
| 2020/0394059 A1 | 12/2020 | Wei |
| 2022/0067307 A1 | 3/2022 | Rei et al. |
| 2022/0096937 A1* | 3/2022 | Dorn ....................... A63F 13/79 |

OTHER PUBLICATIONS

USPTO, Notice of Allowance for U.S. Appl. No. 17/475,844, filed Feb. 1, 2023, 11 pages.

USPTO, Non-final Office Action for U.S. Appl. No. 17/475,844, filed Oct. 11, 2022, 11 pages.

USPTO, Notice of Allowance for U.S. Appl. No. 17/747,433, filed Oct. 17, 2023, 10 pages.

USPTO, International Search Report for International Patent Application No. PCT/US2022/029808, Sep. 2, 2022, 2 pages.

USPTO, Written Opinion for International Patent Application No. PCT/US2022/029808, Sep. 2, 2022, 6 pages.

JPO, Office Action for Japanese Patent Application No. 2023-571679, Oct. 21, 2024, 7 pages.

EPO, Extended European Search Report for European Patent Application No. 22805387.2, Feb. 21, 2025, 10 pages.

JPO, Notice of Grant (with English translation) for Japanese Patent Application No. 2023-571679, Feb. 25, 2025, 5 pages.

Wikipedia, "Copy Protection," retrieved from Internet: https://en.wikipedia.org/w/index.php?title=Copy_protection&oldid=1021677189, 2021, 19 pages.

\* cited by examiner

AUTOMATIC PRESENTATION OF SUITABLE CONTENT

CROSS REFERENCE TO RELATED APPLICATIONS

The present application is a continuation of U.S. patent application Ser. No. 17/747,433, filed on May 18, 2022 and entitled "Automatic Presentation of Suitable Content," which claims the benefit of priority to U.S. Provisional Application No. 63/189,964, filed on May 18, 2021 and entitled "Automatic Presentation of Suitable Content," the entire contents of both of which are hereby incorporated by reference herein.

TECHNICAL FIELD

Embodiments relate generally to computer-based gaming and virtual experiences, and more particularly, to methods, systems, and computer readable media for automatic presentation of suitable content.

BACKGROUND

Some online platforms (e.g., gaming platforms, media exchange platforms, virtual experience platforms, etc.), allow users to connect with each other, interact with each other (e.g., within a game or virtual experience), create games, and share information with each other via the Internet. The online platforms may further provide gaming content. It follows that as gaming content is produced for a first region, locale, and/or age group, users in other regions, locales, or age groups may desire similar or the same gaming content.

In order to provide virtual content to the users in other regions and audiences of different age groups or other demographic characteristics, game developers need to devote resources to ensure the gaming content is suitable for the target group. As different regions have differing rules and standards for presentation of virtual content, as well as different cultural preferences, and some users have different content preferences, ensuring that the content of a virtual experience is suitable for a particular group of users can be difficult or unmanageable. Moreover, some regions may allow some portions of content (e.g., adult language) while completely restricting others (e.g., loot boxes, depictions of violence), further complicating providing localized content to multiple regions or locales.

Example embodiments are presented herein that overcome these and other drawbacks.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to an aspect, a computer-implemented method of presentation of suitable content is provided. The computer-implemented method may comprise: receiving virtual experience content associated with a first virtual experience associated with a first target audience, the received virtual experience content including content that is restricted as not viewable by a second target audience, wherein the second target audience is different than the first target audience; receiving at least one content alternative, the at least one content alternative being an alternative to the received virtual experience content, wherein the at least one content alternative omits or replaces a portion of content from the received virtual experience; generating a first rating for the received virtual experience content and a second rating for the at least one content alternative; and automatically providing only one of the received virtual experience content or the at least one content alternative to user devices based on the first rating and the second rating.

In some implementations, the computer-implemented method may further comprise receiving, from a developer of the first virtual experience, a request to generate the at least one content alternative, wherein the request includes one or more parameters; and in response to the request, automatically generating the at least one content alternative based on the one or more parameters, wherein the at least one content alternative is based on the received virtual experience content and is different from the received virtual experience content.

In some implementations, the one or more parameters comprise one or more of: an age parameter, a location parameter, a gender parameter, or a preference parameter.

In some implementations, the computer-implemented method may further comprise receiving a content rating request from a developer associated with the received virtual experience content, wherein the generating the first and second rating is in response to the content rating request.

In some implementations, generating the first rating and the second rating comprises receiving from a developer a self-rating of the received virtual experience content and a self-rating of the at least one content alternative; and receiving the self-rating of the received virtual experience content and the self-rating of the at least one content alternative comprises receiving, from the developer, at least one flag associated with a portion of the received content that indicates the portion is unsuitable for a particular user demographic or target audience.

In some implementations, the first target audience is associated with a first locale; the second target audience is associated with a second locale; the first rating is a rating based on a first set of local rules associated with the first locale; and the second rating is a rating based on a second set of local rules associated with the second locale.

In some implementations, the computer-implemented method may further comprise indexing the at least one content alternative in a library of content alternatives based on one or more parameters, wherein the one or more parameters comprise one or more of: an age parameter, a location parameter, a gender parameter, or a preference parameter.

In some implementations, the automatically providing comprises: determining that the first rating is suitable for a user associated with a user device; and responsive to determining that the first rating is suitable for the user, providing the received virtual experience content to the user device.

In some implementations, the automatically providing comprises: determining that the first rating is unsuitable for a user associated with a user device; in response to determining that the first rating is unsuitable, determining that the second rating is suitable for the user; and responsive to determining that the second rating is suitable for the user, providing the at least one content alternative to the user device.

In some implementations, the computer-implemented method further comprises altering search engine weighting of the received virtual experience content based upon the first rating and the second rating.

In some implementations, the first rating and the second rating are age-based ratings identifying a respective maximum age of an audience for which content having the first rating and content having the second rating is permissible.

In some implementations, generating the first rating and the second rating comprises receiving from a developer of the received virtual experience content a first self-rating of the received virtual experience content and a second self-rating of the at least one content alternative; obtaining descriptors based upon the first self-rating and the second self-rating; and automatically generating the first rating and the second rating based upon the obtained descriptors.

In some implementations, the first self-rating and the second self-rating are based upon a rating questionnaire, wherein identification of unsuitable content is based on one or more responses to the questionnaire.

In another aspect, a system is provided. The system may comprise: a memory with instructions stored thereon; and a processing device coupled to the memory. The processing device may be configured to access the memory and execute the instructions, wherein the instructions cause the processing device to perform operations comprising: receiving virtual experience content associated with a first virtual experience associated with a first target audience, the received virtual experience content including content that is restricted as not viewable by a second target audience, wherein the second target audience is different than the first target audience; receiving at least one content alternative, the at least one content alternative being an alternative to the received virtual experience content, wherein the at least one content alternative omits or replaces a portion of content from the received virtual experience; generating a first rating for the received virtual experience content and a second rating for the at least one content alternative; and automatically providing only one of the received virtual experience content or the at least one content alternative to user devices associated based on the first rating and the second rating.

In some implementations, the operations further comprise: receiving, from a developer of the first virtual experience, a request to generate the at least one content alternative, wherein the request includes one or more parameters; and in response to the request, automatically generating the at least one content alternative using the one or more parameters, wherein the at least one content alternative is based on the received virtual experience content and is different from the received virtual experience content.

In some implementations, the one or more parameters comprise one or more of: an age parameter, a location parameter, a gender parameter, or a preference parameter.

In some implementations, generating the first rating and the second rating comprises receiving from a developer a self-rating of the received virtual experience content and a self-rating of the at least one content alternative; and receiving the self-rating of the received virtual experience content and the self-rating of the at least one content alternative comprises receiving, from the developer, at least one flag associated with a portion of the received content that indicates the portion is unsuitable for a particular user demographic or target audience.

In some implementations, the first target audience is associated with a first locale; the second target audience is associated with a second locale; the first rating is a rating based on a first set of local rules associated with the first locale; and the second rating is a rating based on a second set of local rules associated with the second locale.

In some implementations, generating the first rating and the second rating comprises: receiving, from a developer of the received virtual experience content, a first self-rating of the received virtual experience content and a second self-rating of the at least one content alternative, wherein the first self-rating and the second self-rating are based upon a rating questionnaire; obtaining descriptors based upon the first self-rating and the second self-rating; and automatically generating the first rating and the second rating based upon the obtained descriptors.

In another aspect, a non-transitory computer-readable medium is provided. The non-transitory computer-readable medium may have instructions stored thereon that, responsive to execution by a processing device, causes the processing device to perform operations comprising: receiving virtual experience content associated with a first virtual experience associated with a first target audience, the received virtual experience content including content that is restricted as not viewable by a second target audience, wherein the second target audience is different than the first target audience; receiving at least one content alternative, the at least one content alternative being an alternative to the received virtual experience content, wherein the at least one content alternative omits or replaces a portion of content from the received virtual experience; generating a first rating for the received virtual experience content and a second rating for the at least one content alternative; and automatically providing only one of the received virtual experience content or the at least one content alternative to user devices based on the first rating and the second rating.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure

DETAILED DESCRIPTION

Figure 1:
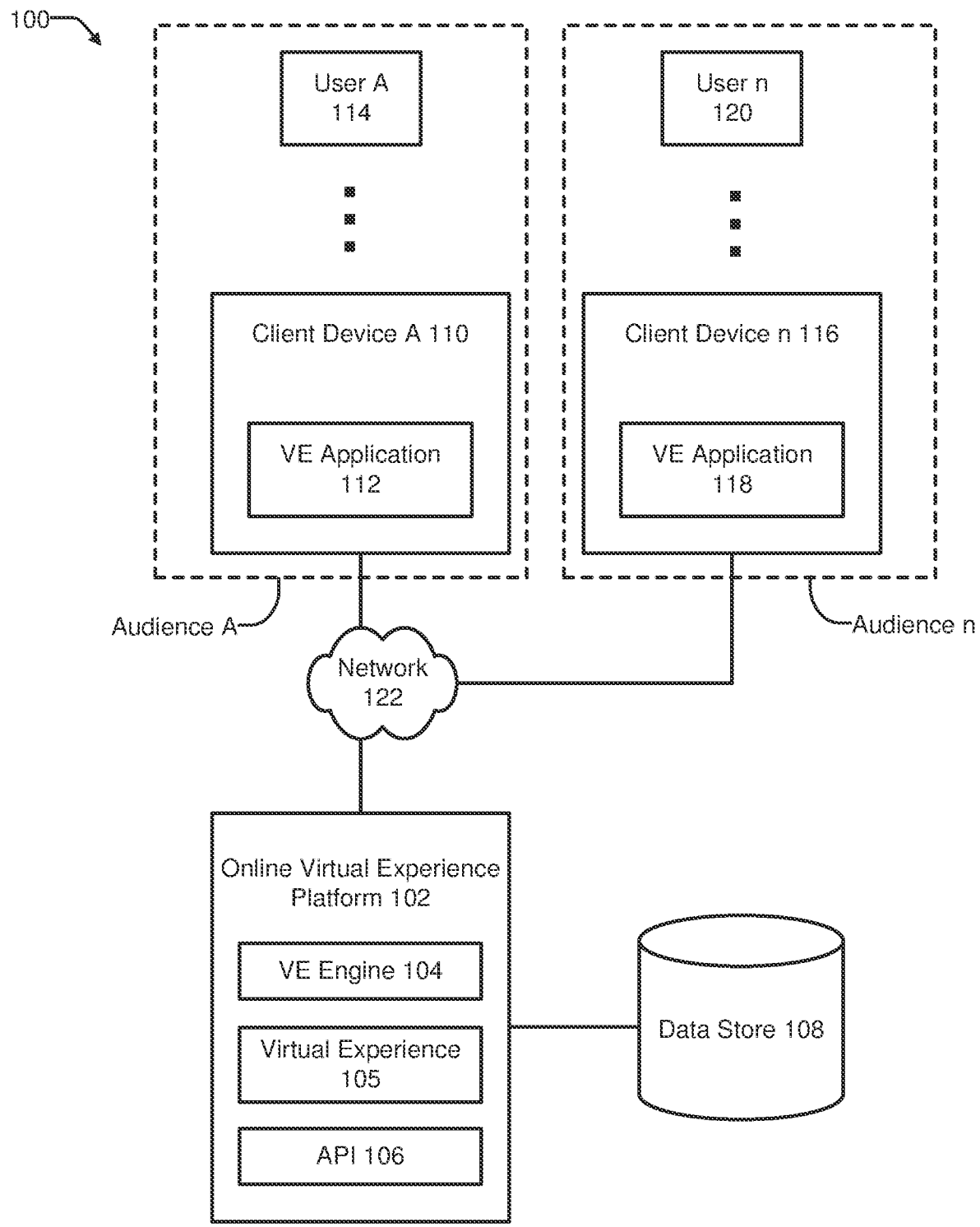
FIG. 1 is a diagram of an example network environment for automatic presentation of suitable content, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online virtual experience platforms (also referred to as "user-generated content platforms" or "user-generated content systems") offer a variety of ways for users to interact with one another. For example, users of an online virtual experience platform may work together towards a common goal, share various virtual content items, send electronic messages to one another, and so forth. Users of an online virtual experience platform may join games or experiences as virtual characters, playing experience-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by one or more non-player characters (NPC) which may be computer-generated characters, e.g., when a single player is part of a game. In another example, a virtual character act singularly or in combination with other virtual characters to engage with a virtual environment and/or a virtual experience.

An online virtual experience platform may also allow users (developers) of the platform to create new experiences, characters, and/or other content. For example, users of the online virtual experience platform may be enabled to create, design, and/or customize new characters or avatars, items, or other content, and make them available to other users.

New user content may be generated and associated with a particular online experience (or made available for use in multiple virtual experiences provided by a virtual experience platform). The new user content may be targeted for a specific audience, region, or locale—where the "association" is independent of where and by whom the content is generated. Audiences may include target audiences of particular demographics and/or age groups. Particular demographics may include age, gender, or other demographics. Region/locale may be used to determine features such as language (for text content), visual appearance (for images), animation type, or any other content attributes. Region or locale may refer to a geographic region, e.g., a city, state, country, continent, etc. or geographic regions defined in other ways (e.g., by local government, regulations, etc.). If the experience is accessed or played by a user in a separate region, the new content is typically subject to the locale's specific governance as related to restrictions on access to content based on age and/or local rules. For example, a locale may restrict user content related to gambling, certain paraphernalia, monetization of game content, language, and others. For example, a locale may also restrict user content based on age. As an additional example, a locale may allow a parent or user to identify preferences that may also automatically restrict content.

Additionally, the described techniques can also customize content for a particular demographic. For example, new user content may be generated and associated with a particular online experience. The new user content may be targeted for a specific demographic—where the "association" is independent of where the content is generated. The targeted demographic may include an age group, such as, general audience, young children, young adults, adults, or other age groups. The targeted demographic may also include a demographic group, such as, male or female players or other demographics. As such, while examples described herein may include a targeted audience, region, or locale specific examples, the described techniques also include a targeted group of players based on demographics, irrespective of a locale, in some implementations. In various implementations, the target audience to provide tailored content of a game or virtual experience may be determined based on a combination of various attributes such as age, gender, locale, language, or other factors.

Virtual experience content may similarly be generated for a first region or locale. Thus, if the experience is to be accessed or played by a player in a different region, the associated content is also typically subject to restrictions to content for the new region.

An objective of the virtual experience platform owner or administrator may include rating of the new user content, the virtual experience content, and any other content associated with a virtual environment or experience such that only suitable content is presented for display for a target audience. A technical problem for platform operators is to ensure suitability of content associated with the platform for various users or players, which can include complex regional, age group, demographic, or locale-specific restrictions on particular content.

Online virtual experience platforms can be massive and reach a plurality of locales that include restrictions on content that change over time. A virtual experience platform that accurately rates or otherwise ensures suitable content is displayed for associated target audiences can therefore effectively present content in compliance with local regulations, user preferences, and/or parental controls.

For example, in conventional content presentation, a virtual experience platform operator needs to engage in lengthy processes whereby locale-specific users and/or regulatory bodies examine content to rate particular content. This can cause delays including vetting, quality control, and other measures to ensure only appropriate content is distributed via media to particular locales and to appropriate audiences. However, online virtual experience platforms constantly produce new content or receive content from users (e.g., developers), rendering traditional approaches difficult or impossible to employ.

The present disclosure addresses the above-described drawbacks by providing a novel network environment and methods that automatically analyze and rate virtual experience content for target audiences, specific demographics, and/or new locales, and provide virtual experiences that are compliant with various regulations as well as match user settings related to content suitability. Developers may be presented with a user interface and Application Programming Interface (API) that allows self-rating of different aspects of a virtual experience (e.g., character or avatars, virtual experience items, virtual content items, in-experience goals/activities, etc.). Further, the described techniques provide automatic generation and storage of alternative virtual experience content more suitable to restrictive locales and/or for other age groups. Virtual experience content may be rated, parsed/indexed, and stored for provision to a desired target audience such that users accessing an experience from different locales may be presented content that is suitable for their demographic and/or their respective locale.

The network environment may also allow virtual experience developers to obtain locale-specific guidelines and/or parental guidelines and/or demographic guidelines, utilize the API (e.g., provided by the virtual experience platform) to generate and provide a library of alternate content, and otherwise ensure suitable content for their virtual experience to be presented at a particular locale and/or to a particular audience. Through automatic rating and storage of alternate virtual experience content, larger audiences can be reached while ensuring a high quality online experience generally commensurate with other locales and age groups.

FIG. 1 illustrates an example network environment 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral.

The network environment 100 (also referred to as a "system" herein) includes an online virtual experience platform 102, a first client device 110, and a second client device 116 (generally referred to as "client devices 110/116" herein), all connected via a network 122. The client device 110 may be associated with a first Audience A while the second client device 116 may be associated with a second Audience n. The network 122 may enable communication across any plurality of locales or regions, providing for communication between the client devices 110/116 and the online virtual experience platform 102.

The online virtual experience platform 102 can include, among other things, a virtual experience engine 104, one or more virtual experiences 105, an API 106, and a data store 108. The client device 110 can include a virtual experience application 112. The client device 116 can include a virtual experience application 118. Users 114 and 120 can use client devices 110 and 116, respectively, to interact with the online virtual experience platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience platform 102 can include a server having one or more computing devices (e.g., a cloud computing system, a rackmount server, a server computer, cluster of physical servers, virtual server, etc.). In some implementations, a server may be included in the online virtual experience platform 102, be an independent system, or be part of another system or platform.

In some implementations, the online virtual experience platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience platform 102 and to provide a user with access to online virtual experience platform 102. The online virtual experience platform 102 may also include a website (e.g., one or more webpages) or application back-end software that may be used to provide a user with access to content provided by online virtual experience platform 102. For example, users may access online virtual experience platform 102 using the virtual experience application 112/118 on client devices 110/116, respectively.

In some implementations, online virtual experience platform 102 may include a type of social network providing connections between users or a type of user-generated content system that allows users (e.g., end-users or consumers) to communicate with other users via the online virtual experience platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user." Additionally, in some implementations, a particular age group and/or demographic and/or locale may be associated with a user and the user's client device. In these implementations, user data may be used to identify the particular age group and/or demographic and/or locale for content presentation controls as described herein.

In some implementations, online virtual experience platform 102 may be a virtual gaming platform. For example, the gaming platform may provide single-player or multi-player games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, other collaboration platforms can be used with rating and presentation features described herein instead of or in addition to online virtual experience platform 102. For example, a social networking platform, purchasing platform, messaging platform, creation platform, etc. can be used.

In some implementations, "gameplay" may also generally refer to interaction of one or more users using client devices (e.g., 110 and/or 116) within a virtual experience (e.g., 105) or the presentation of the interaction on a display or other output device of a client device 110 or 116.

One or more virtual experiences 105 are provided by the online virtual experience platform. In some implementations, a virtual experience 105 can include an electronic file that can be executed or loaded using software, firmware or hardware configured to present the virtual content (e.g., digital media item) to an entity. In some implementations, a virtual experience application 112/118 may be executed and a virtual experience 105 rendered in connection with a virtual experience engine 104. In some implementations, a virtual experience 105 may have a common set of rules or common goal, and the virtual environments of a virtual experience 105 share the common set of rules or common goal. In some implementations, different experiences may have different rules or goals from one another.

In some implementations, virtual experiences may have one or more environments (also referred to as "virtual environments" herein) where multiple environments may be linked. An example of an environment may be a three-dimensional (3D) environment. The one or more environments of a virtual experience 105 may be collectively referred to a "world" or "gaming world" or "virtual world" or "universe" or "metaverse" herein. An example of a world may be a 3D world of a virtual experience 105. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual content (or at least present virtual content to appear as 3D content whether or not 3D representation of geometric data is used). 2D environments or 2D worlds use graphics that use two-dimensional representation of geometric data representative of virtual content.

In some implementations, virtual experiences may have alternate content (described in more detail with reference to FIG. 2) stored in a library of alternatives. The alternate content may be produced by a developer through use of the API 106 or instructions thereof, and may include alternate content for presentation to different target audiences and/or at different locales. Accordingly, the online virtual experience platform 102 may present alternate content for Audience n compared to Audience A. The alternate content may include a plurality of content, with each content rated differently based on demographic, age, or other factors.

In some implementations, the online virtual experience platform 102 can host one or more virtual experiences 105 and can permit users to interact with the virtual experiences 105 (e.g., search for experiences, related content, or other content) using a virtual experience application 112/118 of client devices 110/116. Users (e.g., 114 and/or 120) of the online virtual experience platform 102 may play, create, interact with, or build virtual experiences 105, search for virtual experiences 105, communicate with other users, create and build objects (e.g., also referred to as "item(s)" or "virtual objects" or "virtual game item(s)" herein) of virtual experiences 105, and/or search for objects. For example, in generating user-generated virtual items, users may create characters, decoration for the characters, one or more virtual environments for an interactive experience, or build structures used in a virtual experience 105, among others.

In some implementations, users (e.g., 114 and/or 120) of the online virtual experience platform 102 may create, build, and rate virtual experiences 105 through use of the API 106. During creation and building, or subsequent thereto, the users of the online virtual experience platform 102 may rate the entirety or portions of the created experiences and/or environments. The rating may be facilitated through a self-rating questionnaire and/or survey, such that a presentation of content suitable for a particular audience or locale is possible by only presenting content rated as suitable from the developing user. Furthermore, through rating particular portions, and creation of corresponding alternate portions with different ratings, a virtual experience with alternate content suitable for a particular audience and/or locale may be facilitated.

In some implementations, users may buy, sell, or trade virtual objects, such as in-platform currency (e.g., virtual currency), with other users of the online virtual experience platform 102. In some implementations, online virtual experience platform 102 may transmit virtual content to virtual experience applications (e.g., 112). In some implementations, virtual content (also referred to as "content" herein) may refer to any data or software instructions (e.g., objects, environments, experiences, user information, video, images, commands, media item, etc.) associated with online virtual experience platform 102 or virtual experience applications.

In some implementations, virtual objects (e.g., also referred to as "item(s)" or "objects" or "virtual game item(s)" herein) may refer to objects that are used, created, shared or otherwise depicted in virtual experience applications 105 of the online virtual experience platform 102 or virtual experience applications 112 or 118 of the client devices 110/116. For example, virtual objects may include a part, model, character, tools, weapons, clothing, buildings, vehicles, currency, flora, fauna, components of the aforementioned (e.g., windows of a building), and so forth.

In some implementations, virtual objects and virtual game objects may also have suitable alternates created by users of the online virtual experience platform 102. In this manner, if a particular locale has restrictions on virtual currency or other virtual objects, a user may designate appropriate alternate virtual objects for deployment at those locales. Similarly, if a particular locale has restrictions on tools or weapons, a user may designate alternate virtual objects for deployment at those locales. Furthermore, alternate content appropriate for multiple age groups, or targeted for more mature groups, can also be created through the API 106.

It may be noted that the online virtual experience platform 102 hosting virtual experiences 105, is provided for purposes of illustration, rather than limitation. In some implementations, online virtual experience platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 105 may be associated with a particular user or a particular group of users (e.g., a private virtual experience), or made widely available to users of the online virtual experience platform 102 (e.g., a public virtual experience). In some implementations, where online virtual experience platform 102 associates one or more virtual experiences 105 with a specific user or group of users, online virtual experience platform 102 may associate the specific user(s) with a virtual experience 105 using user account information (e.g., a user account identifier such as username and password). In these circumstances, the API 106 may also facilitate privatizing a particular virtual experience or virtual content such that it may be rated by the private group to aid in determining suitable content for a particular audience or a particular locale, or a combination thereof. Upon rating, and possibly upon generation of suitable alternate content, some virtual experiences may then become a public virtual experience with alternate content presented depending upon a particular locale, demographic, age group, and/or other considerations.

In some implementations, online virtual experience platform 102 or client devices 110/116 may include a virtual experience engine 104 or virtual experience application 112/118. The virtual experience engine 104 can include a virtual experience application similar to virtual experience application 112/118. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.). In some implementations, virtual experience applications 112/118 of client devices 110/116, respectively, may work independently, in collaboration with virtual experience engine 104 of online virtual experience platform 102, or a combination of both.

In some implementations, both the online virtual experience platform 102 and client devices 110/116 execute a virtual experience engine (104, 112, and 118, respectively). The online virtual experience platform 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 105 may have a different ratio between the virtual experience engine functions that are performed on the online virtual experience platform 102 and the virtual experience engine functions that are performed on the client devices 110 and 116.

For example, the virtual experience engine 104 of the online virtual experience platform 102 may be used to generate physics commands in cases where there is a collision between at least two virtual objects, while the additional virtual experience engine functionality (e.g., generate rendering commands) may be offloaded to the client device 110. In some implementations, the ratio of virtual experience engine functions performed on the online virtual experience platform 102 and client device 110 may be changed (e.g., dynamically) based on interaction or "gameplay" conditions. For example, if the number of users participating in a virtual experience 105 exceeds a threshold number, the online virtual experience platform 102 may perform one or more virtual experience engine functions that were previously performed by the client devices 110 or 116.

For example, users may be engaging with a virtual experience 105 on client devices 110 and 116, and may send control instructions (e.g., user inputs, such as right, left, up, down, user election, or character position and velocity information, etc.) to the online virtual experience platform 102. Subsequent to receiving control instructions from the client devices 110 and 116, the online virtual experience platform 102 may send instructions (e.g., position and velocity information of the characters participating in the group interaction or commands, such as rendering commands, collision commands, etc.) to the client devices 110 and 116 based on control instructions. For instance, the online virtual experience platform 102 may perform one or more logical operations (e.g., using virtual experience engine 104) on the control instructions to generate instructions for the client devices 110 and 116. In other instances, online virtual experience platform 102 may pass one or more of the control instructions from one client device 110 to other client devices (e.g., 116) participating in the virtual experience 105. The client devices 110 and 116 may use the instructions and render the virtual experience changes/movements/etc. for presentation on the displays of client devices 110 and 116.

In some implementations, the control instructions may refer to instructions that are indicative of in-experience actions of a user's character. For example, control instructions may include user input to control the in-experience action, such as right, left, up, down, user selection, gyroscope position and orientation data, force sensor data, etc. The control instructions may include character position and velocity information. In some implementations, the control instructions are sent directly to the online virtual experience platform 102. In other implementations, the control instructions may be sent from a client device 110 to another client device (e.g., 116), where the other client device generates instructions using the local virtual experience engine 104. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or virtual objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the virtual experience 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual object (e.g., body parts, etc.) but the user may control the character (without the character virtual object) to facilitate the user's interaction with the virtual experience (e.g., a puzzle experience where there is no rendered character virtual object, but the user still controls a character to control in-experience action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience platform 102. In some implementations, creating, modifying, or customizing characters, other virtual objects, virtual experiences 105, or virtual environments may be performed by a user using a user interface (e.g., developer interface) and with or without scripting (or with or without an application programming interface (API 106)). It may be noted that for purposes of illustration, rather than limitation, characters are described as having a humanoid form. In may further be noted that characters may have any form such as a vehicle, animal, inanimate object, or other creative form.

In some implementations, the online virtual experience platform 102 may store characters created by users in the data store 108. In some implementations, the online virtual experience platform 102 maintains a character catalog and game catalog that may be presented to users via the virtual experience engine 104, virtual experience 105, and/or client device 110/116. In some implementations, the game catalog includes images of virtual experiences stored on the online virtual experience platform 102. In addition, a user may select a character (e.g., a character created by the user or other user) from the character catalog to participate in the chosen virtual experience. The character catalog includes images of characters stored on the online virtual experience platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online virtual experience platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the virtual experience application 112 or 118, respectively. In one implementation, the virtual experience application 112 or 118 may permit users to use and interact with online virtual experience platform 102, such as search for a virtual experience or other content, control a virtual character in a virtual environment hosted by online virtual experience platform 102, or view or upload content, such as virtual experiences 105, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 or 116 and allows users to interact with online virtual experience platform 102. The virtual experience application may render, display, or present the content (e.g., a web page, a user interface, a media viewer) to a user. In an implementation, the virtual experience application may also include an embedded media player (e.g., a Flash® player) that is embedded in a web page.

According to aspects of the disclosure, the virtual experience application 112/118 may be an online virtual experience platform application for users to build, create, edit, upload content to the online virtual experience platform 102 as well as interact with online virtual experience platform 102 (e.g., interact with virtual experiences 105 hosted by online virtual experience platform 102). As such, the virtual experience application 112/118 may be provided to the client device 110 or 116 by the online virtual experience platform 102. In another example, the virtual experience application 112/118 may be an application that is downloaded from a server.

In some implementations, a user may login to online virtual experience platform 102 via the virtual experience application. The user may access a user account by providing user account information (e.g., username and password) where the user account is associated with one or more characters available to participate in one or more virtual experiences 105 of online virtual experience platform 102.

In general, functions described as being performed by the online virtual experience platform 102 can also be performed by the client device(s) 110 or 116, or a server, in other implementations if appropriate. In addition, the functionality attributed to a particular component can be performed by different or multiple components operating together. The online virtual experience platform 102 can also be accessed as a service provided to other systems or devices through appropriate application programming interfaces (APIs), and thus is not limited to use in websites.

In some implementations, online virtual experience platform 102 may include an API 106. In some implementations, the API 106 may be a system, application, software code, or module that enables the online virtual experience platform 102 to expose rating and alternate content functionality to users (including developers), where the rating and alternate content functionality permits the users to rate virtual experiences, and create alternate virtual content, items, listing of items, or other content within the online virtual experience platform 102. In some implementations, the API 106 may facilitate, in concert with the virtual experience engine 104 and online virtual experience platform 102, one or more of the operations described below in connection with the flowcharts shown in FIGS. 6, and 7, utilizing the features illustrated in FIGS. 1 and 2. It is further noted, that the API 106 may provide an interface of instructions exposed to a developer including self-rating questionnaires, surveys, goals, proposed actions, and/or appropriate methods for indexing alternate content, for example.

In some implementations, the API 106 may be exposed to a developer and may present a rating questionnaire and/or survey allowing a developer to self-rate one or more portions, or the entirety of, the virtual experience 105. A "rating" as used herein may be a measure of the suitability of a particular game to be presented to a particular audience. Examples of ratings can include ratings of a video game content rating system. A video game content rating system is a system used for the classification of video games into groups based on suitability of the game to each particular group. Many video game rating systems are associated with and/or sponsored by a government of a particular locale or a ratings agency (e.g., agreed to by industry participants), and are sometimes part of the local motion picture rating system. Accordingly, while particular ratings may be termed differently (e.g., E for Everyone and/or G for General Audience), each rating may be applicable to a demographic or age group. Thus, the self-rating questionnaire may aid in identifying the demographic or age group rather than a particularly termed rating.

As used herein, a "target audience" is a term that indicates an individual user or client device 110 (or a set of users or client devices), and within a same virtual experience session users will or should receive a suitable version of virtual experience content (e.g., if a 6-year old, 12-year old, and 18-year old are all in the same session, virtual content will be presented based on suitability of the content for the entire group). For example, as used herein, a virtual experience session refers to a plurality of users accessing a virtual experience 105 and engaging in the virtual experience 105 from one or more client devices associated with one or more target audiences. According to one implementation, users of a same virtual experience session, but having different ages and/or demographics, are each provided appropriate content based on the user's demographic and any other characteristics. In this manner, each user may automatically receive different, but appropriate, content. According to some implementations, users of a same virtual experience session will each receive the lowest, most appropriately rated content for the most restricted age group to which at least one player in the virtual experience session is associated with. In this alternative example, every player receives the same content, rated to be in accordance with the most restrictive age group (or other characteristic). The same may be varied based on user settings, parental controls, global settings for the virtual experience session, and/or other attributes. Accordingly, different alternate content associated with different virtual experience sessions may also be generated and distributed as described herein.

As used herein, a "locale" is associated with an individual user or client device 110. Within a same virtual experience session users receive a suitable version of virtual experience content (e.g., if American and Brazilians and Germans are all in the same session, game content are presented based on suitability of the American, Brazilian, and German audience or locales; or other such content localization). For example, as used herein, a virtual experience session refers to a plurality of users accessing a virtual experience 105 and engaging in the virtual experience 105 from one or more locales. According to one implementation, users of a same virtual experience session, but residing in different locales, each receive appropriate content based on the user's demographic data and the locale's restrictions. In this manner, each user may automatically be provided different, but appropriate, content. According to other implementations, players of a same virtual experience session, but residing at different locales, each receive the lowest, most appropriately rated content for the most restricted locale to which at least one user player in the virtual experience session resides. In this alternative example, every player receives the same content, rated to be in accordance with the most restrictive locale. The same may be varied based on user settings, parental controls, global variables for the virtual experience session, and/or other attributes. Accordingly, different alternate content associated with different virtual experience sessions may also be processed and distributed as described herein.

Hereinafter, a more detailed discussion of the API 106 and generation & rating of virtual experience content are presented with reference to FIG. 2.

Figure 2:
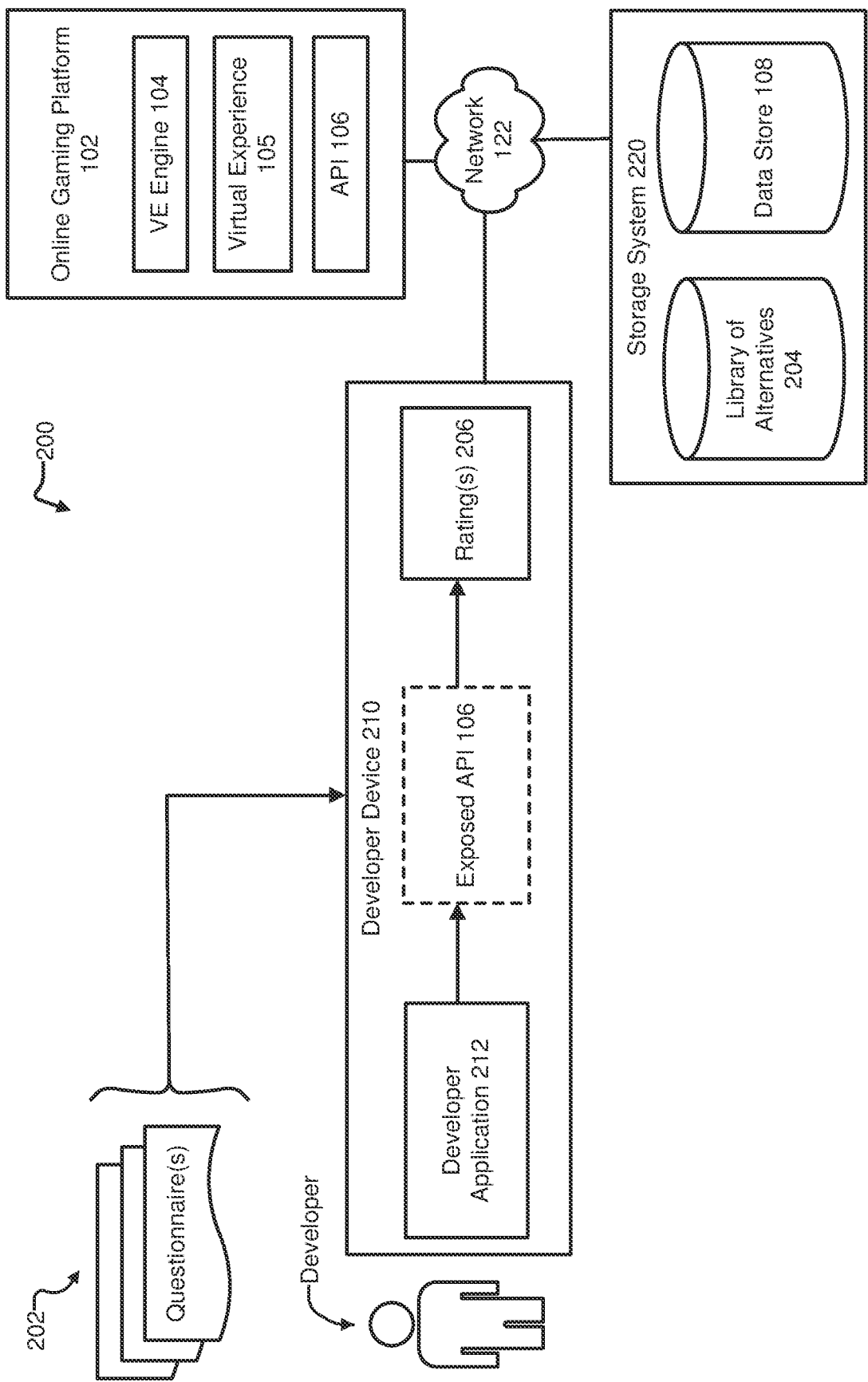
FIG. 2 is a diagram of an example network environment for automatic presentation of suitable content, in accordance with some implementations.

FIG. 2 is a diagram of an example developer network environment 200 for automatic presentation of suitable content, in accordance with some implementations. The network environment 200 (also referred to as a "system" herein) includes the online virtual experience platform 102, a developer device 210 (similar to "client devices 110/116"), and a storage system 220, all connected via network 122.

In some implementations, the storage system 220 may include the data store 108 and a library of alternatives 204. The storage system 220 may include a non-transitory computer readable memory (e.g., random access memory), a cache, a drive (e.g., a hard drive), a flash drive, a database system, or another type of component or device capable of storing data. The storage system 220 may also include multiple storage components (e.g., multiple drives or multiple databases) that may also span multiple computing devices (e.g., multiple server computers) such as individualized storage components for the library of alternatives 204 and/or the data store 108.

In some implementations, the library of alternatives 204 is configured to store virtual content, such as virtual experience 105 or associated content that is indexed according to a particular demographic, age group, and/or locale. Thus, if a virtual experience 105 is to be presented to a client device associated with a first locale having a first type of restriction on content, alternate content stored at the library of alternatives 204 may be identified which is in compliance with that first type of restriction. In this example, the alternate content may be stored in the library of alternatives 204 and retrieved for presentation to ensure that the presented virtual experience 105 meets the first type of restriction. Similarly, if a virtual experience 105 is to be presented to a client device associated with a second locale n having no restrictions on content, alternate content stored at the library of alternatives 204 may be ignored and/or less restricted content may be presented. Additionally, if a virtual experience 105 is to be presented to a client device associated with a first age group or demographic, alternate content stored at the library of alternatives 204 may be identified which is suitable to that first age group or demographic. Other such examples of varying alternate content based on one or more parameters are within the scope of this disclosure.

The library of alternatives 204 may also be configured to store alternate versions of characters, clothing, avatars, accessories, and other similar virtual content. In some implementations, alternate versions of characters, clothing, avatars, and accessories may be identified based on a user preferences, user demographics, user locale, and other attributes as described herein.

The library of alternatives 204 may include indexed content as described above which is self-rated (e.g., by a provider of the content, such as a developer) using one or more questionnaires 202 and/or indexed based upon one or more parameters. The one or more parameters may include, for example, an age parameter, a location parameter, a gender parameter, or a preference parameter. Generally, the questionnaires 202 may include one or more questions directed to a type, form, and/or presentation of content of a particular virtual experience. The one or more questions may be tailored to receive one or more multiple choice, binary (e.g., yes or no), sliding scale, or other answers from a virtual experience developer. The one or more questions may aid in identifying content that is suitable or unsuitable for a particular demographic or age group or a particular locale. Alternatively, or in combination, developers can tag content to indicate its appropriateness for a specific audience so the virtual experience can dynamically fetch an appropriate representation. Additionally, one or more trained machine learning models may be used to automatically classify content (e.g., virtual objects, sounds, video, or other content that is included in a virtual experience) to ensure it is provided to users only as appropriate.

For example, and without limitation, the one or more questions contained in the questionnaire may include a series of escalating or deescalating questions related to action, language, violence, currency, fear, adult content, items, humor, crude humor, and/or miscellaneous types of content that any virtual experience may contain. Based on the self-reported answers provided by a developer, content may be flagged as suitable, appropriate, unsuitable, and/or inappropriate for a particular demographic or age group at a particular locale. Additionally, the flagged content may be associated with one or more content alternatives stored at the library of alternatives 204. Thus, while an initial version (e.g., provided by a developer) of a virtual experience may include a plurality of different types of content that may be unsuitable to some demographics based on local laws, regulations, restrictions, or preferences, the responses to questionnaires 202 may facilitate generation of content at the library of alternatives 204 such that the unsuitable content may be replaced, during runtime or prior to runtime, at the locales restricting that content (or for particular age groups) through use of the library of alternatives, as described in more detail below.

In some implementations, the API 106 may be exposed to the developer device 210 and developer application 212. The exposed API 106 may present one or more function calls to the developer. For example, the one or more function calls can include, but are not limited to, GetUserLocale(userid)—to get the current user's locale; GetUserDemographic(userid)—to get the current user's demographic; GetUserRestrictions(userid)—to get the current user's restrictions based on parental controls or preferences; GetContentItem (userlocale, itemid)—to get a 'version' of the item appropriate for the demographic/locale obtained for a user; AddItem(itemID, locale)—e.g., same itemID can be used to refer to alternate versions of the same item based on user locale matching the locale parameter; GetQuestionnaire (locale)—to receive a questionnaire that allows rating for a particular locale; GetQuestionnaire(age)—to receive a questionnaire that allows rating for a particular age group; IsFeatureTypeAAllowedForUser(uesrid)—to receive a Boolean indication of whether a feature is restricted for a particular user (e.g., IsLootBoxesAllowedForUser(userid), etc.); and other suitable function calls. Other implementations may not necessitate explicit function calls (e.g., a developer inserts an object into an online environment or scene, and that object is loaded dynamically for each client based on their demographic/locale configuration).

Questionnaires 202 may be presented to the developer, based on an API function call, such that self-rating of aspects of the virtual experience 105 may occur. During the self-rating using the questionnaires 202, the exposed API 106 may present other function calls (e.g., AddItem(itemID, locale)) to produce alternate content that causes a differing answer any one or more questions of the questionnaire 202. For example, if a virtual experience contains violence, the exposed API 106 may present the developer a function to provide a content alternative that mitigates, reduces, or eliminates the level of violence depicted in the virtual experience in a locale that has stringent rules on violent content, or for an age group that has particular restrictions on violent content. Thereafter, that content alternative may be indexed and stored with the original content, at the library of alternatives 204. The developer may similarly rate and produce alternatives based on responses to each question of the questionnaires 202.

In some implementations, self-ratings provided by the developer are validated. For example, a combination of proactive and reactive human moderation to validate suitability of content may be used in some implementations.

With regard to proactive moderations, experiences that are ranked as critical to validate may be manually reviewed proactively. Virtual experience examples of experiences that may be ranked critically include: experiences that are rated as suitable for all ages (e.g., including young children), most popular experiences among certain age groups, most popular experiences among restricted locales, relatively highly popular experiences among certain age groups, relatively highly popular experiences among restricted locales, and/or other similar experiences.

In some implementations, a trained machine learning model may analyze content in a particular experience such as individual images, 3D models, and code to flag experiences that have discrepancies between the overall rating of the experience and insights gathered from more granular content. For example, if the experience has a number of images with blood and explosions, but the overall experience is marked as non-violent and therefore suitable for all ages, it should be flagged for manual review.

Additionally, ratings of "similar" experiences may be leveraged to flag some experiences for review. For example, if an experience is mostly played by older users, but is marked as suitable for all ages, it may be prioritized for review. For example, if the experience is played mostly by users that are playing other more adult experiences, but the given experience is rated for younger age group, it may be prioritized for review.

With regard to reactive moderations, users may report incorrect ratings and, based on user reports, a ranked queue of prioritized experiences may be created for manual review. Other sources including crowdsourcing of reviews, user-provided reports, moderation activity, complaints, and other suitable sources may also be used to implement reactive prioritization queues of experiences for manual review, in some implementations.

In some implementations, when additional alternative content is not available, and/or if alternative content is not suitable for certain demographics, and the default content is not allowed for display to them (e.g., due to regional compliance), the experience may be made unavailable for the audience it is not suitable for.

Thereafter, the answers to the questionnaires 202 as well as the content alternatives may be associated with ratings 206. The ratings 206 may be specific to each content alternative and/or each virtual experience 105. Thus, when a virtual experience is to be presented for interaction by a client device associated with a particular locale or demographic, the virtual experience engine 104 may identify a rating 206 appropriate and suitable for a user and/or a locale, and present the content (or alternative content) associated with the rating 206. In this manner, a user with less restrictions may engage with the same virtual experience 105 as a user with more restrictions, using alternate content from the library of alternatives 204.

While some portions of a virtual experience 105 may be presented with content alternatives, overall interaction within an experience may not be affected. For example, as the developer chooses which content is produced as an alternative, the developer may choose suitable content alternatives that do not detract from gameplay or virtual experience interactions. This choice may benefit both the developer and the user as the availability of content alternatives enables exposure of the game or virtual experience to more restricted locales and/or age groups, while the user is able to access otherwise inaccessible virtual experiences. Furthermore, a developer is also required to only develop alternatives to particular portions of the virtual experience 105. Therefore, a developer may choose to deploy a virtual experience with only violence alternatives, language alternatives, or other alternatives, while still restricting access for other portions of a virtual experience such as currency or gambling content. Thus, a developer may target suitable audiences of a more limited demographic while also improving monetization or exposure of the virtual experience 105.

In some implementations, an associated index of the library of content alternatives 204 is used at runtime (e.g., during providing a virtual experience session) to look up content that matches the session requirements and include it. For example, as a user is accessing a virtual experience (e.g., during runtime), the platform 100 may search the index of the library of content alternatives 204 for applicable content alternatives based upon user data and/or demographic data and/or locale data. Upon identifying suitable content alternatives from the library of content alternatives 204, the provided virtual experience may be further provided the identified alternatives for presentation at the user device.

Technical effects and benefits of the questionnaires 202 and library of alternatives 204 include at least the following: developer response to the questionnaires can enable the platform to take actions (e.g., generation of content alternatives, ranking content, etc.) to offer increased exposure to audiences; improved adherence to local guidelines and regulations without manual effort of content review and/or alternative content generation; and ensured suitability of content presented at client devices associated with a locale or demographic, while also limiting risk in widespread (across multiple locales and/or user demographics) presentation of virtual experiences, and also while increasing developer engagement with the online virtual experience platform 102.

As described above, developers may produce one or more content alternatives for storage at the library of alternatives 204. Additionally, the platform 102 can automatically provide default alternatives that effectively disable unsuitable content (e.g., a plain cube as an alternative for a 3D model, etc.). Additionally, the platform 102 can automatically locate content similar to the content provided by the developer and propose alternative content based on alternatives of the found matches. Other variations may also be applicable.

Figure 3:
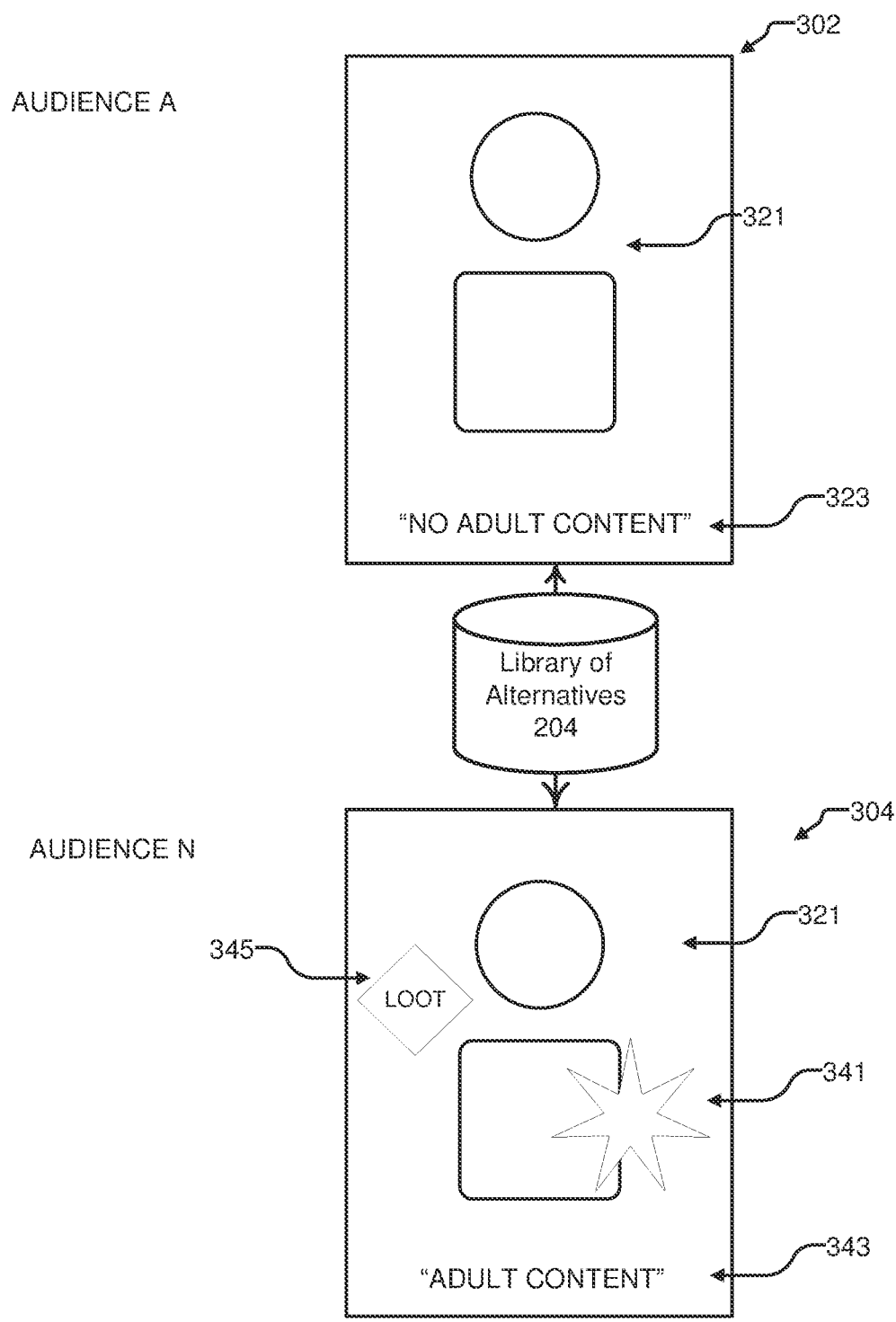
FIG. 3 is a diagram illustrating example presentations of suitable content, in accordance with some implementations.

FIG. 3 is a diagram illustrating example presentations of suitable virtual content, in accordance with some implementations. As shown in FIG. 3, a first alternate content 302 (also referred to as content alternative 302) and a second alternate content 304 (also referred to as content alternative 304) may be stored at the library of alternatives 204.

The first alternate content 302 may be content generally suitable for a wide audience across a large number of locales. For example, the first alternate content 302 may include a basic presentation of character 321 devoid of violence, adult content, and/or other restricted content. Furthermore, the first alternate content 302 may include no adult content 323 presented therein. As such, in this example, the first alternate content 302 may be suitable for presentation to virtually any audience in adherence with guidelines for a first targeted audience A.

The second alternate content 304 may be content generally suitable for a restricted audience across a limited number of locales. For example, the second alternate content 304 may include basic presentation of character 321 having a rated (or self-rated) content containing violence (341) as well as a rated (or self-rated) content containing currency (345), e.g., a loot box. Furthermore, the second alternate content 304 may include one or more adult content items presented therein (343). As such, in this example, the second alternate content 304 may be presented only to an appropriate audience which meets the guidelines for a second targeted audience and may be restricted from presentation to other audiences.

The appropriate audience(s) may be identified through user data or user demographic data obtained from a user. The user data may include age, demographic, and/or location. User permission is obtained to record and use such data; and if a user doesn't provide such permission data, the generic (e.g., G rated) version of the virtual experience and/or virtual content may be provided as a default. Other user data may also be used to identify any age-related or demographic-related restrictions, including IP address data (e.g., for restricted locations such as schools, edifices, office buildings, etc.), administrator privileges, payment status of account (e.g., for unrestricted premium play features), and/or other data.

Figure 4:
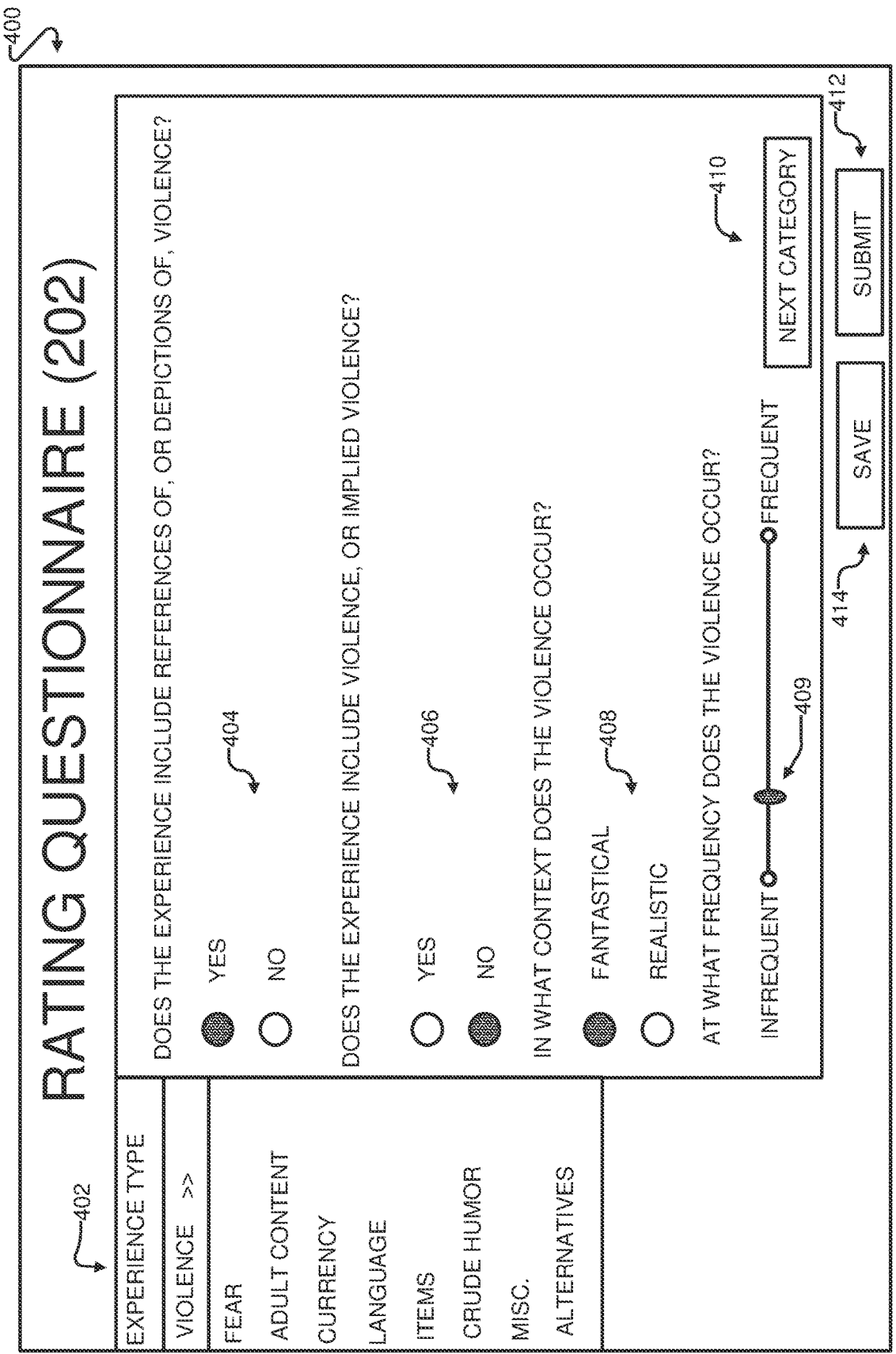
FIG. 4 is a schematic of a developer user interface, in accordance with some implementations.

In some implementations, a developer may provide any number of content alternatives to flagged content through the exposed API 106 and/or questionnaires 202. For example, FIG. 4 is a schematic of a developer user interface 400, in accordance with some implementations. The interface 400 includes a content identification portion 402, a plurality of questions 404, 406, 408, 409 associated with one or more content portions, and various control portions 410, 412, 414.

The content identification portion 402 may indicate a particular category of virtual content and possible alternatives. For example, the content identification portion 402 may provide for selection and answering of questions related to type of virtual experience, violence, fear, adult content, currency, language, items, crude humor, miscellaneous content, and/or possible alternatives. As the developer selects a particular category from 402, the developer may answer questions 404, 406, 408, and 409. It is noted that although a limited number of questions is illustrated for the sake of brevity and clarity, any number of questions may be implemented.

Based on a particular answer to a particular question 404, 406, 408, and 409 a rating 206 for a particular demographic and/or locale may be generated. Furthermore, alternatives (e.g., 402) may be designated such that ratings 206 can be generated for each content alternative. In this manner, while a typical virtual experience has a single content rating for a single demographic and/or locale, virtual experiences 105 according to some implementations may include a plurality of ratings based on a plurality of content alternatives. As such, any combination of self-rated alternative content may be used to form a virtual experience 105 presented to client devices associated with a particular demographic and/or locale. Thus, while a virtual experience presented in a first locale or to a first audience A may be restricted to include content similar to example content 302, a virtual experience presented in a second locale or to a second audience n may include content similar to example content 304, in some implementations. Various other combinations, including combinations where not all audiences can be presented suitable content are possible. However, in general, a greater number of users may be presented content if even a limited number of content alternatives (or even a single content alternative to violence, for example) are created with the exposed API 106 and questionnaires 202.

In some implementations, ratings may be generated (or predicted) based on answers to the questionnaires as they are submitted, such that a developer may see how various types of content affect ratings. In some implementations, associated descriptors used in generating ratings may also be provided for view by developers, such that a developer may see how various types of content affect generation of differing descriptors. Additionally, or in combination, rakings or weights of search engines may be affected by ratings, descriptors, and/or answers to the questionnaires. In this regard, the effect to the surfacing of content may also be considered by developers engaging with the questionnaires.

As presented above, content alternatives stored at the library of alternatives 204, may allow presentation of suitable content to wider audiences and to audiences in multiple locales having content regulations that restrict content. These alternatives may allow a developer's virtual experience to reach a greater number of users and therefore increase engagement in the online virtual experience platform 102.

Figure 5:
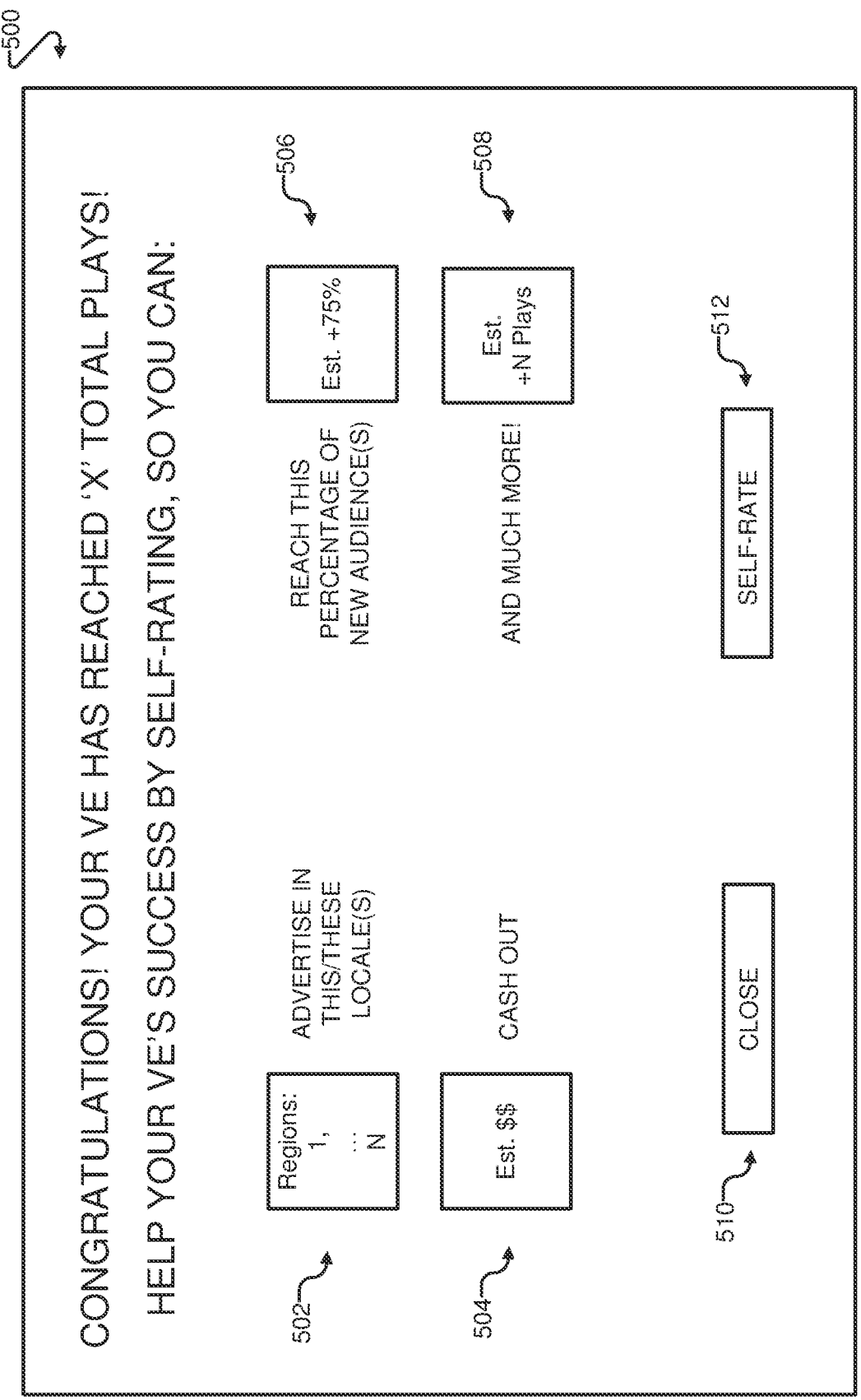
FIG. 5 is a schematic of a developer user interface, in accordance with some implementations.

FIG. 5 is a schematic of a developer user interface 500, in accordance with some implementations. As illustrated, the user interface 500 provides a developer with a visualization of an increase in engagement, monetization, advertisement, and other metrics based on use of the exposed API 106 and self-rating methodologies. For example, a developer may be presented the user interface 500 upon creation of a virtual experience 105. The user interface 500 may present the developer various metrics or statistics of possible benefits to self-rating and/or creation of content alternatives. The illustrated increases in engagement described below may be generated based on historical analysis of engagement in multiple locales, empirical analysis of engagement based on larger audiences and/or alternative content, and other estimations.

Portion 502, for example, may present the developer with the improved metrics based upon reaching additional audiences using advertising in other locales based on self-rating and providing content alternatives; portion 504 may present the developer with improved monetization metrics based on reaching additional audiences using self-rating and providing content alternatives; portion 506 may present the developer with improved engagement metrics based on reaching additional audiences using self-rating and providing content alternatives; and, portion 508 may present the developer with other metrics (e.g., an increase in number of plays or sessions) based on self-rating and providing content alternatives. If choosing to self-rate, the developer may select interface control portion 512 which may direct the developer to one or more of the questionnaires 202 and/or API 106 as described above. Additionally, a developer may select interface control portion 510 to exit the interface 500.

As described above, a developer may be presented with one or more questionnaires 202 and exposed API 106 for generation of self-ratings and content alternatives. Using the content alternatives and associated localized ratings, a virtual experience 105 may be presented to different audiences and across different locales, thereby increasing engagement with the online virtual experience platform 102 while also ensuring local guidelines and regulations related to content restrictions are observed. In this manner, a developer can concentrate on content creation, rather than content restriction, and can be provided with automated tools for presentation of suitable content outside of the developer's knowledge of regional restrictions and/or user/parent preferences.

Hereinafter, methods of operations of the network environments 100 and 200, including the online virtual experience platform 102 and associated components, are described in detail with reference to FIG. 6 and FIG. 7.

Figure 6:
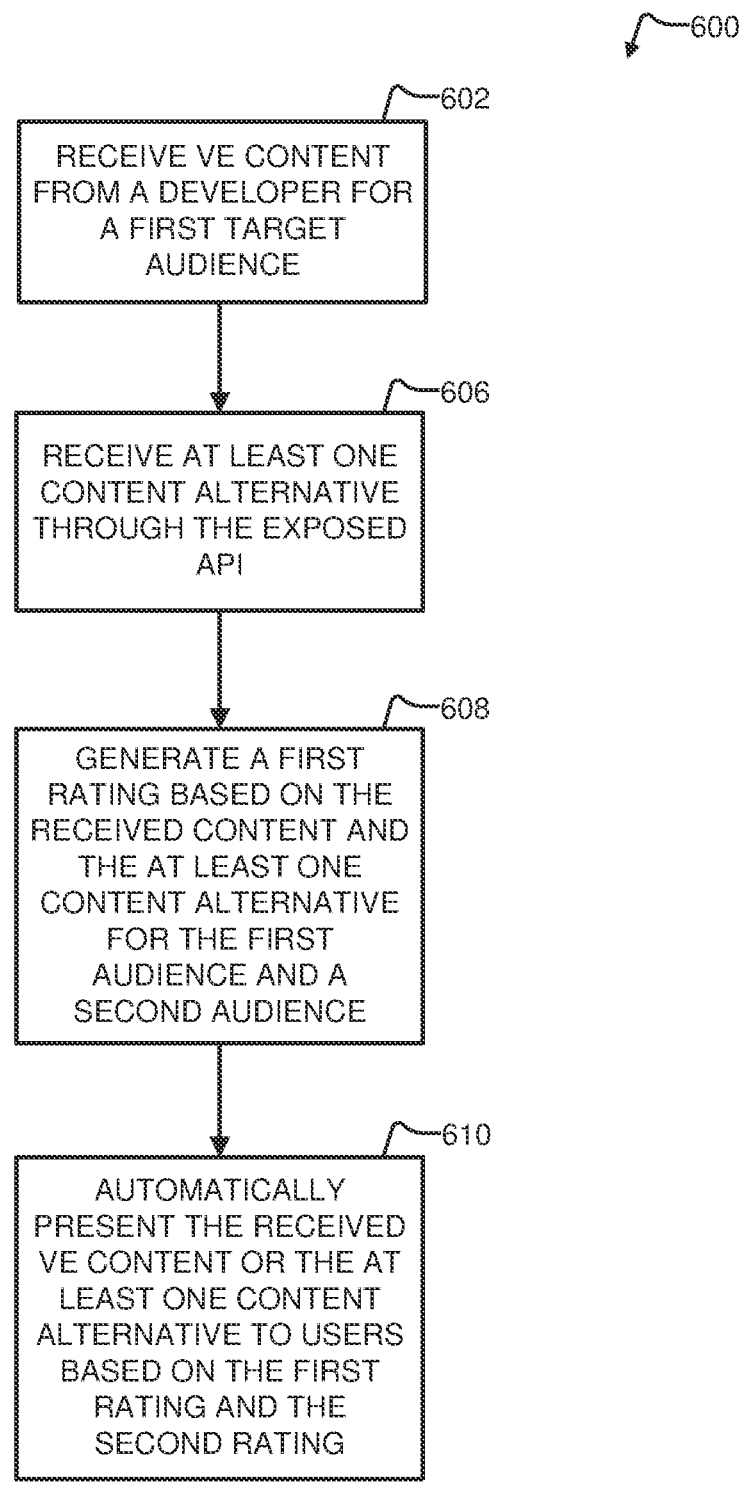
FIG. 6 is a flowchart illustrating an example method of automatic presentation of suitable content, in accordance with some implementations.

FIG. 6 is a flowchart illustrating an example method 600 of automatic presentation of suitable content, in accordance with some implementations. In some implementations, method 600 can be implemented, for example, on a server system, e.g., online virtual experience platform 102 as shown in FIG. 1. In some implementations, some or all of the method 600 can be implemented on a system such as one or more client devices 110 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 600. The method 600 begins at block 602.

At block 602, virtual experience content is received from a developer. The virtual experience content and/or the developer may be associated with a first locale, or the content may be directed towards a first targeted audience. A "locale" is associated with an individual user, developer, developer device 210, and/or client device 110. Additionally, the first targeted audience may be similar to audience A. The associated locale may have a governing body responsible for local governance and content restrictions for video games, media content, game content, movies, and/or other content.

In some implementations, the virtual experience content may be associated with virtual experience 105. For example, the virtual experience 105 may be provide to a plurality of users via one or more virtual experience sessions, where each user is part of a particular session of virtual experience 105. For example, the virtual experience engine 107 and/or server 104 may allow for many sessions of the same virtual experience 105 with each session having its own environment (e.g., 5 players could together interact with a session of a pizza shop experience, and a separate 3 players could interact with another session of the same virtual experience). The developer-provided content in both virtual experience sessions would be same, but the virtual avatars, user-generated content, and other content of the players would be specific, and the environment could develop differently, (e.g., the shops and pizza menus would be different) based on the actions by the respective users.

The API 106 is exposed to the developer, through the developer device 210. For example, the developer application 212 may display or grant access to various instruction(s) and function calls of the exposed API 106. Using the exposed API 106, the developer may develop virtual experience content alternatives for storage in the library of alternatives 204. The virtual experience content alternatives may include alternative content, such as limited violence, obscured virtual money, tamer language, language translations, and other alternative content. Furthermore, using the exposed API 106, the developer may develop monetization features, advertising features, and/or other features. Block 602 may be followed by block 606.

At block 606, at least one content alternative is received through the exposed API 106 and stored at the library of alternatives 204 (or alternatively, at the storage system 220/data store 108). The stored at least one content alternative may be indexed such that it is easily presented in place of the received virtual experience content, in some implementations. The index may include a placeholder, timestamp, or other identification data such that it is readily identifiable as an alternative to the received virtual experience content. For example, each portion of alternate content may include at least an identifier, such as an itemID, experienceID, locale, developerID, and/or other identifiers. The alternate content may subsequently be retrieved based on a current state of the virtual experience being matched to the stored identifiers. In this manner, a database call may be made to retrieve alternate or original content, based on a rating or locale, and an appropriate identifier. Additionally, the index may be based on one or more parameters such as an age parameter, gender parameter, locale/region parameter, and so forth. Block 606 may be followed by block 608.

At block 608, a first rating for the received virtual experience content and/or the at least one content alternative is generated. As described above, the first rating may be based on one or more questionnaires, user preferences, age groups, local guidelines, local governance, or other parameters. The first rating may be based on a developer's self-rating of particular portions of a virtual experience, and may be inclusive of those portions of the virtual experience. Furthermore, rating review and generation may be automated by scanning virtual experience assets automatically and comparing them against the developer-supplied rating. Additionally, ratings may be computed automatically based on this information which would reduce the amount of information solicited from the developer. Generally, as multiple individual ratings may exist for a particular virtual experience based on multiple alternate contents, there are many permutations of a particular virtual experience available.

The first rating may be associated with a particular audience, locale or multiple locales with similar content ratings systems in place. As such, a first rating for the received virtual experience content may include one rating for a first locale, one rating for a second locale, one rating for a first targeted audience, one rating for a second targeted audience, and so forth. Similarly, the at least one content alternative may include one rating for the first locale, one rating for the second locale, one rating for the first targeted audience, one rating for the second targeted audience, and so forth. In one implementation, at least two targeted audiences associated with a first rating (first audience) and a second rating (second audience) are applicable. Additional ratings are also applicable. Block 608 may be followed by block 610.

At block 610, the received virtual experience content or the at least one content alternative is provided to a client device associated with a user automatically, based on the first rating and the second rating. For example, if being presented for audience A, virtual experience content 302 may be presented (FIG. 3). Additionally, if being presented for audience n, gaming content 304 may be presented (FIG. 3). To manage different locales and demographics, a hierarchical tree may be created which starts with the global default at the root and allows customization of specific elements at each node in the subtree. This would allow the flexibility to tailor only specific features for a given locale/country/demographic but follow all other defaults and also to nest regions and demographics within each other.

In some implementations, the providing the at least one content alternative may include replacing one or more virtual objects with a suitable object (e.g., replace an automatic multi-round gun with a manual single shot gun; replace adult billboard with PG billboard; change object behavior—e.g., a snakebite may result in blood trickle for PG but blood explosion for R). In some implementation, the providing the at least one content alternative may include replacing one or more virtual objects that are not suitable for a younger or more restricted audience, with a blank or general default object (e.g., such as a cube, box, cylinder, etc.). In some implementations, the providing the at least one content alternative may include replacing one or more virtual objects that are not suitable for a younger or more restricted audience, with a warning object or label (e.g., such as a red or yellow flag, message to parents, etc.).

It should be readily understood that multiple other content alternatives may each have associated ratings, and therefore, these example are non-limiting of all implementations. Furthermore, ratings may exceed suitability for some demographics (e.g., if a locale is very restrictive or if parental controls are in place), and therefore, there may be no suitable content available for presentation. In these scenarios, a developer may develop additional content alternatives such that one or more suitable alternatives may be presented. Furthermore, given that regulations at particular locales may change, alternatives may be rated multiple times to ensure continued adherence to local guidelines and restrictions.

Blocks 602-610 can be performed (or repeated) in a different order than described above and/or one or more steps can be omitted. For example, block 606 and 608 may be performed multiple times, e.g., to receive multiple alternatives to content and multiple ratings. In this manner, portions of method 600 may be repeated until all portions of a virtual experience session are appropriately rated for a demographic and/or locale, using data stored in the platform.

Figure 7:
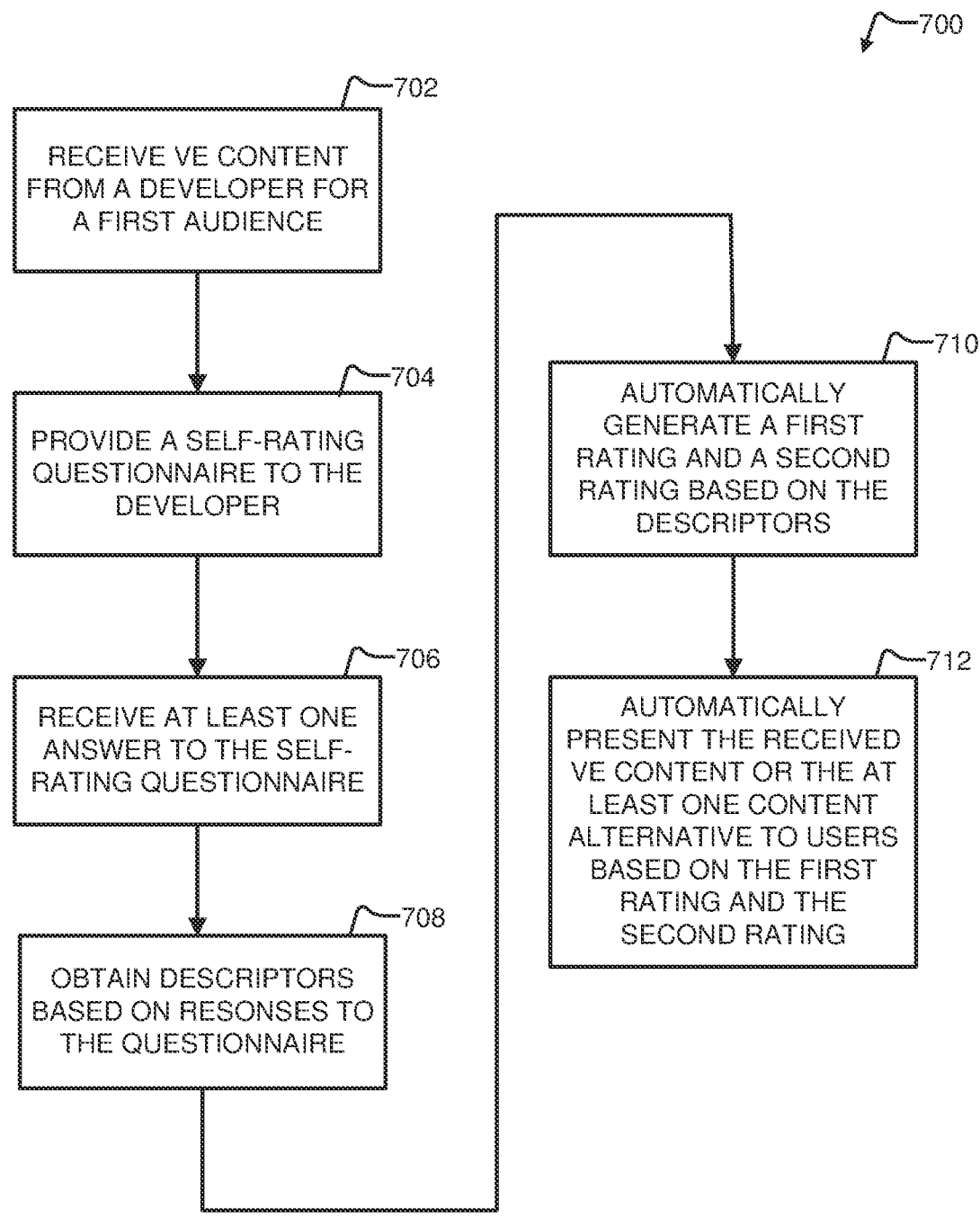
FIG. 7 is a flowchart illustrating another example method of automatic presentation of suitable content, in accordance with some implementations.

FIG. 7 is a flowchart illustrating another example method 700 of automatic presentation of suitable content, in accordance with some implementations. In some implementations, method 700 can be implemented, for example, on a server system, e.g., online virtual experience platform 102 as shown in FIG. 1. In some implementations, some or all of the method 700 can be implemented on a system such as one or more client devices 110 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700. The method 700 begins at block 702.

At block 702, virtual experience content is received from a developer. Additionally, at least one content alternative may be received from the developer. The virtual experience content and/or the developer may be associated with a first locale, or the content may be directed towards a first targeted audience. The at least one content alternative may be associated with a second locale, or directed towards a second targeted audience. A "locale" is associated with an individual user, developer, developer device 210, and/or client device 110. Additionally, the first targeted audience may be similar to audience A. The second targeted audience may be similar to audience n. The associated locale may have a governing body responsible for local governance and content restrictions for video games, media content, game content, movies, and/or other content.

In some implementations, the virtual experience content and content alternative may be associated with virtual experience 105. For example, the virtual experience 105 may include one or more virtual experience sessions, as well. For example, the virtual experience engine 107 and/or server 104 may allow for many sessions of the same virtual experience 105 with each session having its own environment. The developer-provided content in both virtual experience sessions would be same, but the virtual avatars, user-generated content, and other content of the players would be specific, and the environment could develop differently based on the actions by the respective players. Block 702 is followed by block 704.

At block 704, a self-rating questionnaire or questionnaires 202 are provided to the developer, through the developer device 210. For example, the developer application 212 may display or grant access to the questionnaires 202. Using the questionnaires 202, the developer may flag particular content as containing possibly restricted content, develop new or additional virtual experience content alternatives for storage in the library of alternatives 204, and otherwise self-rate portions of the received virtual experience content and the content alternative. The virtual experience content alternatives may include alternative content, such as limited violence, obscured virtual money, tamer language, language translations, and other alternative content. The self-ratings may be in the form of answers to the questionnaires 202. Block 704 is followed by block 706.

At block 706, at least one answer to the displayed questionnaires 202 is received. The at least one answer may identify one or more portions of the received virtual experience content as containing violence, fear, adult content, currency, language, items, crude humor, or other content. The at least one answer may also relate to a level of violence, fear, adult content, currency, language, items, crude humor, or other content. For example, the at least one answer may reference a number of occurrences, a number of depictions, a type of depiction (real or fantasy), frequency of depictions, whether the content is "implied" rather than directly shown, and other similar references. Additional answers related to the at least one content alternative may also be received. Block 706 is followed by block 708.

At block 708, descriptors are obtained based on the at least one answer to the self-rating questionnaire. The descriptors may be obtained, for example, as an output from a machine learning model trained to identify descriptors based on the self-rating questionnaires. A series of ground-truth labeled data may be used to initially train the machine learning model based on desirable descriptors and suitable virtual experience and alternative content examples. Further training, sometimes iterative training, may be performed to tailor the machine learning model to obtain descriptors based on real-world examples of virtual experiences deployed at a plurality of locales and to a plurality of target audiences. Block 708 is followed by block 710.

At block 710, a first rating for the received virtual experience content is generated for a first target audience and a second rating is generated for a second target audience, based on the obtained descriptors. As described above, the ratings may be based on one or more questionnaires, local guidelines, local rules, user preferences, demographics, or other parameters. The first rating may be associated with a particular audience, locale or multiple locales with similar content ratings systems in place. As such, a first rating for the received virtual experience content may include one rating for a first locale, one rating for a second locale, one rating for a first targeted audience, one rating for a second targeted audience, and so forth. Similarly, the at least one content alternative may include one rating for the first locale, one rating for the second locale, one rating for the first targeted audience, one rating for the second targeted audience, and so forth. In one implementation, at least two targeted audiences associated with a first rating (first audience) and a second rating (second audience) are applicable. Additional ratings are also applicable.

The generated ratings may be based on the descriptors and generated automatically. For example, for each descriptor, an explicit mapping may be used to map to a rule set, a numerical score may be derived from the developer's questionnaire responses, or other suitable manners of translating descriptors into age ratings may be used. In one implementation, a formula for deriving a numerical score may be represented by Equation 1, provided below:

$$\text{intensity}_{content} * \text{frequency}_{content} = \text{score}_{content} \qquad \text{Equation 1}$$

It is noted that other functions may also be feasible for determining a numerical score. For example, in one implementation, a formula for deriving a numerical score may be represented by Equation 2, provided below:

$$\text{intensity\_weight} * \text{intensity}_{content} + \text{frequency\_weight} * \text{frequency}_{content} = \text{score}_{content} \qquad \text{Equation 2}$$

Other alternative scoring methods may also be suitable, in some implementations. Once scores have been generated (where applicable) for each queried descriptor, the highest of the individual numerical scores determines the overall classification of the content.

One Example of a numerical classification score is provided below:

| Descriptor: | Total Score: | Overall Classification: |
|---|---|---|
| Descriptor A | 2 | 7 |
| Descriptor B | 7 | |
| Descriptor C | 5 | |

Each descriptor may be based upon one or more features, such as, for example, relevant intensity values and scores associated to each one of them (intensity$_{content}$), relevant frequency values and scores associated with each one of them (frequency$_{content}$), and/or mapping from score$_{content}$ to an age rating or demographic rating.

Additionally, a set or sets of rules may be established mapping from a set of descriptors to regions/locales in which content should be restricted to a particular rating. Furthermore, a set or sets of rules may also be established mapping from a set of descriptors to different platforms on which content should be restricted to a particular rating. Other rules sets may also be established to facilitate mapping descriptors to particular ratings based on demographics, locales, and other considerations. Block 710 is followed by block 712.

At block 712, the virtual experience content or content alternative is provided to client device associated with a user automatically, based on the first rating and the second rating. For example, if being presented to audience A, virtual experience content 302 may be presented if the associated demographic or locale permits display of content 302. Additionally, if being presented to Audience n, virtual experience content 304 may be presented if the associated demographic or locale permits display of content 304. It is noted that there may exist multiple differently rated content alternatives such that experiences may be tailored to several different audiences based upon the availability of suitable content alternatives.

It should be readily understood that ratings may exceed suitability for some demographics (e.g., if the locale is very restrictive), and therefore, there may be no suitable content available for presentation. In these scenarios, a developer may develop additional content alternatives such that one or more suitable alternatives may be presented, such as described with reference to FIG. 3 and FIG. 6. Furthermore, given that regulations at particular locales may change, the received content may be rated multiple times to ensure continued adherence to local guidelines and restrictions.

Blocks 702-712 can be performed (or repeated) in a different order than described above and/or one or more steps can be omitted. For example, blocks 704, 706, 708, and 710 may be performed multiple times, e.g., to rate for multiple demographics and/or locales. In this manner, portions of method 700 may be repeated until all portions of a virtual experience session are appropriately rated for a client, using data stored in the platform.

Figure 8:
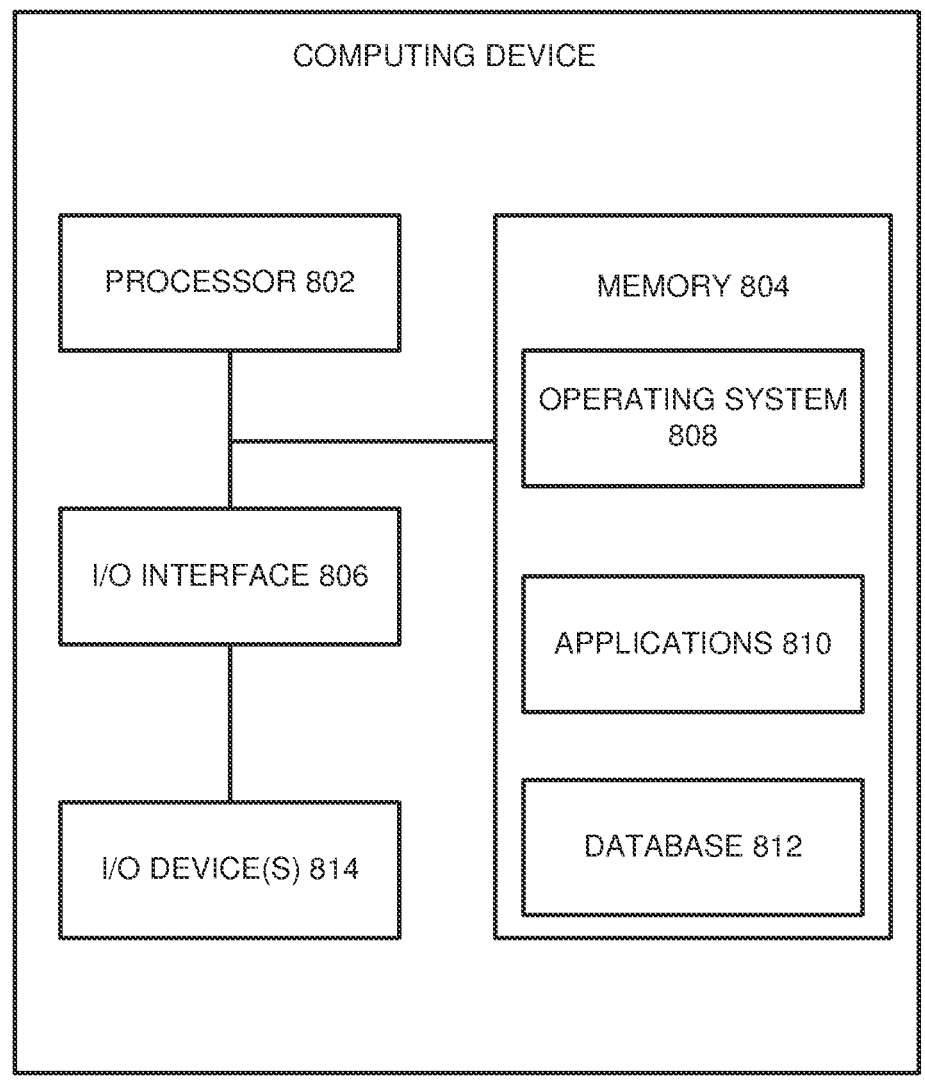
FIG. 8 is a block diagram illustrating an example computing device, in accordance with some implementations.

FIG. 8 is a block diagram of an example computing device 800 which may be used to implement one or more features described herein. In one example, device 800 may be used to implement a computer/client device (e.g. 110 of FIG. 1, 210 of FIG. 2), and perform appropriate method implementations (e.g. 600 of FIGS. 6 and 700 of FIG. 7) described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, one or more applications 810, e.g., a translation application and database 812. In some implementations, application 810 can include instructions that enable processor 802 to perform the functions (or control the functions of) described herein, e.g., some or all of the methods described with respect to FIG. 6 and FIG. 7.

For example, applications 810 can include a rating application (e.g., to present a questionnaire) and/or database module 812, which as described herein can provide ratings of virtual experience content for an online virtual experience content server (e.g., 104). Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 120, 122), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 814 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software engines. In other implementations, device 800 may not have all of the components shown and/or may have other elements including other types of elements instead of, or in addition to, those shown herein. While the online virtual experience server 104 is described as performing operations as described in some implementations herein, any suitable component or combination of components of online virtual experience server 104 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In situations in which certain implementations discussed herein may obtain or use user data (e.g., user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of automatic presentation of suitable content, the method comprising:
   receiving virtual experience content associated with a virtual experience associated with a first client locale and a developer, the received virtual experience content including content that is restricted at a second client locale;
   receiving at least one content alternative, the at least one content alternative being an alternative to replace the received virtual experience content;
   receiving one or more descriptors of the virtual experience content and the at least one content alternative from the developer;
   generating a first localized rating for the received virtual experience content and a second localized rating for the at least one content alternative based at least on the one or more descriptors; and automatically providing the received virtual experience content or the at least one content alternative to a user device associated with the second client locale based on the first localized rating and the second localized rating.

2. The computer-implemented method of claim 1, wherein the developer is associated with the first client locale.

3. The computer-implemented method of claim 1, wherein an application programming interface (API) is exposed to the developer and the API facilitates automatic generation of the at least one content alternative.

4. The computer implemented method of claim 1, wherein receiving the one or more descriptors further comprises receiving, from the developer, a flag for content that is unsuitable for a particular demographic of users.

5. The computer-implemented method of claim 1, wherein the first localized rating is a video game rating associated with a set of local rules associated with the first client locale, and wherein the second localized rating is a video game rating associated with a set of local rules associated with the second client locale.

6. The computer-implemented method of claim 1, wherein the at least one content alternative is indexed and stored in a library of alternatives and is identifiable as a replacement for the received virtual experience content.

7. The computer-implemented method of claim 1, wherein the automatically providing comprises:
 determining that the first localized rating is suitable for the second client locale; and
 responsive to determining that the first localized rating is suitable for the second client locale, presenting the received virtual experience content to the user device associated with the second client locale.

8. The computer-implemented method of claim 1, wherein the automatically providing comprises:
 determining that the first localized rating is unsuitable for the second client locale;
 determining that the second localized rating is suitable for the second client locale; and
 responsive to determining that the second localized rating is suitable for the second client locale, presenting the at least one content alternative to the user device associated with the second client locale.

9. The computer-implemented method of claim 1, wherein an application programming interface (API) is exposed to the developer and the API facilitates automatic generation of the first localized rating and the second localized rating with the one or more descriptors.

10. A system comprising:
 a memory with instructions stored thereon; and
 a processing device, coupled to the memory, the processing device configured to access the memory and execute the instructions, wherein the instructions cause the processing device to perform operations comprising:
  receiving virtual experience content associated with a virtual experience associated with a first client locale and a developer, the received virtual experience content including content that is restricted at a second client locale;
  receiving at least one content alternative, the at least one content alternative being an alternative to replace the received virtual experience content;
  receiving one or more descriptors of the virtual experience content and the at least one content alternative from the developer;
  generating a first localized rating for the received virtual experience content and a second localized rating for the at least one content alternative based at least on the one or more descriptors; and
  automatically providing the received virtual experience content or the at least one content alternative to a user device associated with the second client locale based on the first localized rating and the second localized rating.

11. The system of claim 10, wherein the developer is associated with the first client locale.

12. The system of claim 10, wherein an application programming interface (API) is exposed to the developer and the API facilitates automatic generation of the at least one content alternative.

13. The system of claim 10, wherein receiving the one or more descriptors further comprises receiving, from the developer, a flag for content that is unsuitable for a particular demographic of users.

14. The system of claim 10, wherein the first localized rating is a video game rating associated with a set of local rules associated with the first client locale, and wherein the second localized rating is a video game rating associated with a set of local rules associated with the second client locale.

15. The system of claim 10, wherein the at least one content alternative is indexed and stored in a library of alternatives and is identifiable as a replacement for the received virtual experience content.

16. The system of claim 10, wherein the automatically providing comprises:
 determining that the first localized rating is suitable for the second client locale; and
 responsive to determining that the first localized rating is suitable for the second client locale, presenting the received virtual experience content to the user device associated with the second client locale.

17. The system of claim 10, wherein the automatically providing comprises:
 determining that the first localized rating is unsuitable for the second client locale;
 determining that the second localized rating is suitable for the second client locale; and
 responsive to determining that the second localized rating is suitable for the second client locale, presenting the at least one content alternative to the user device associated with the second client locale.

18. The system of claim 10, wherein an application programming interface (API) is exposed to the developer and the API facilitates automatic generation of the first localized rating and the second localized rating with the one or more descriptors.

19. A non-transitory computer-readable medium with instructions stored thereon that, responsive to execution by a processing device, causes the processing device to perform operations comprising:
 receiving virtual experience content associated with a virtual experience associated with a first client locale and a developer, the received virtual experience content including content that is restricted at a second client locale;
 receiving at least one content alternative, the at least one content alternative being an alternative to replace the received virtual experience content;
 receiving one or more descriptors of the virtual experience content and the at least one content alternative from the developer;

generating a first localized rating for the received virtual experience content and a second localized rating for the at least one content alternative based at least on the one or more descriptors; and automatically providing the received virtual experience content or the at least one content alternative to a user device associated with the second client locale based on the first localized rating and the second localized rating.

20. The non-transitory computer-readable medium of claim 19, wherein receiving the one or more descriptors further comprises receiving, from the developer, a flag for content that is unsuitable for a particular demographic of users.

\* \* \* \* \*